United States Patent [19]
Lauer et al.

[11] Patent Number: 5,339,936
[45] Date of Patent: Aug. 23, 1994

[54] SYNCHRONIZER PRE-ENERGIZER SPRING SYSTEM

[75] Inventors: Ernst H. Lauer, Kalamazoo; James L. Martin, Galesburg, both of Mich.

[73] Assignee: Eaton Corporation, Cleveland, Ohio

[21] Appl. No.: 65,789

[22] Filed: May 24, 1993

[51] Int. Cl.$^5$ .............................................. F16D 23/08
[52] U.S. Cl. .................................................. 192/53 E
[58] Field of Search ............... 192/53 E, 53 F, 53 G, 192/48.91; 74/339

[56] References Cited

U.S. PATENT DOCUMENTS

| | | |
|---|---|---|
| 2,667,955 | 2/1954 | Bixby . |
| 3,529,484 | 9/1970 | Tomita et al. ................... 74/339 |
| 3,910,390 | 10/1975 | Eichinger . |
| 4,018,319 | 4/1977 | Thomas . |
| 4,478,321 | 10/1984 | De Franco et al. . |
| 4,989,706 | 2/1991 | Morscheck . |

*Primary Examiner*—Rodney H. Bonck
*Attorney, Agent, or Firm*—Paul S. Rulon

[57] ABSTRACT

A pin-type double acting synchronizer clutch (10) is disclosed with improved pre-energizer spring assemblies (46 or 52). The spring assemblies each include at least two leaf springs 48 or 54 sandwiched between split pin members (44). Retainers (50 or 55) at opposite ends of the leafs prevent escape of the leafs from between the split pin members. In one embodiment the retainers (50) are formed separate of the leafs and in another embodiment the retainers (55) are integrally formed with the leafs (54) by an extension (54d,54e,54f) of one end of each leaf.

20 Claims, 3 Drawing Sheets

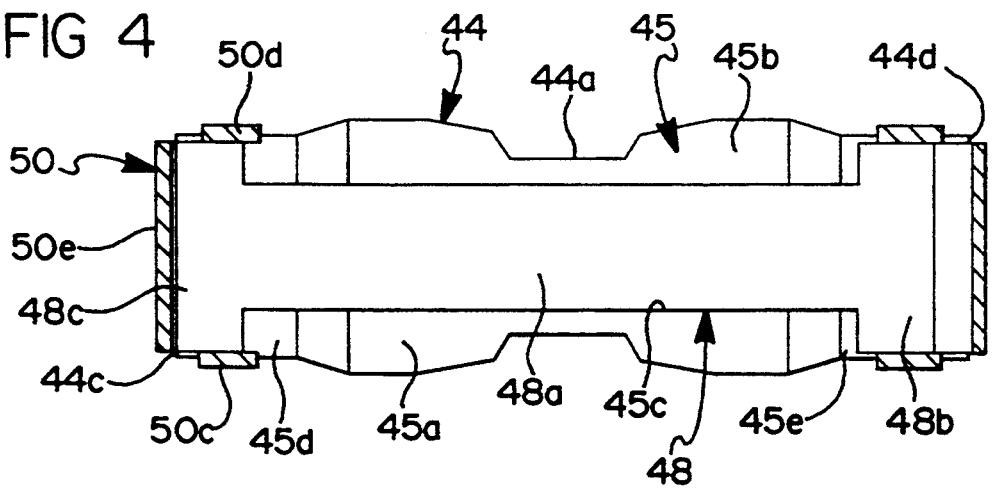
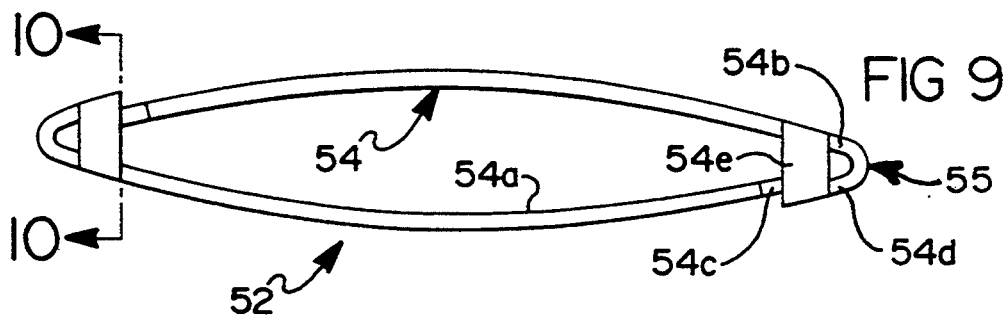
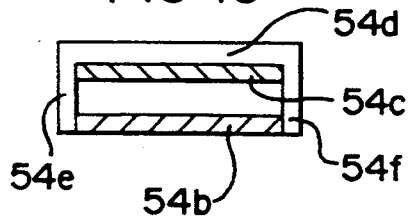
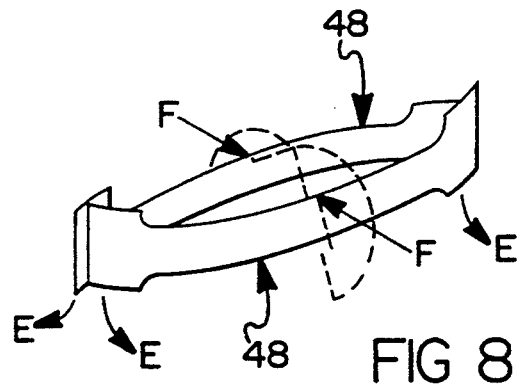
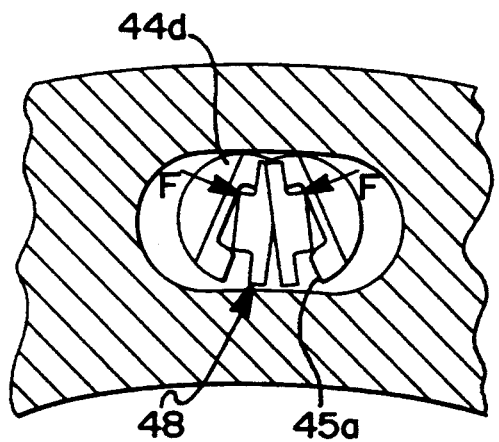
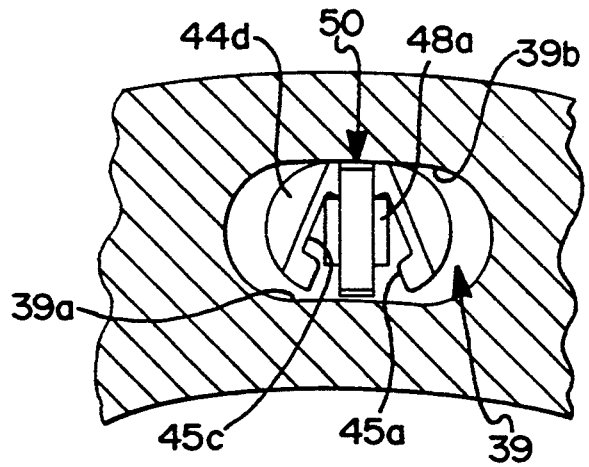

SYNCHRONIZER PRE-ENERGIZER SPRING SYSTEM

FIELD OF THE INVENTION

This invention relates to a pin-type synchronizer for a transmission. More specifically, this invention relates to an improved preenergizer spring arrangement for such a synchronizer.

BACKGROUND OF THE INVENTION

Pin-type synchronizers of the general type disclosed herein are well known in the prior art as may be seen by reference to U.S. Pat. Nos. 2,667,955; 3,910,390; 4,018,319; 4,478,321 and 4,989,706, the disclosures of these patents are incorporated herein by reference.

Pin-type synchronizers generally include an axially slidable clutch collar that is mounted on a splined portion of a shaft on which a pair of axially spaced gears are rotatably mounted. The clutch collar is provided with jaw clutch teeth which are adapted to engage complimentary jaw clutch teeth formed on the rotatable gears to positive clutch a selected one of the gears to the shaft. The clutch collar is formed with a radially extending flange having two sets of circumferentially spaced openings extending axially therethrough and parallel to the rotational axis of the shaft. Disposed through one set of the openings are pins which are rigidly fixed at their ends to friction rings that are adapted to cooperate with friction surfaces affixed to the aforementioned gears. The pins, usually called blocker pins, have reduced central portions that define radially outwardly extending shoulders adapted to cooperate with peripheral edges of the openings for blocking axial movement of the flange relative to the friction rings during nonsynchronous rotation of the shaft and a selected one of the gears. Disposed through the other set of openings, which are alternately spaced between the blocker pin openings, are longitudinally split pin assemblies which are freely received at their ends in oblong recesses formed in mutually facing surfaces of the friction rings. Each split pin assembly includes a pair of members forming a centrally located annular groove which is biased into engagement with the peripheries of the associated split pin opening by springs sandwiched between the members. As is well known, the split pin assemblies cause one of the friction rings to engage a friction surface of a selected one of the gears in response to initial axial movement of the flange, thereby effecting limited relative rotation of the flange and friction rings during the aforementioned nonsynchronous condition for assuring blocking engagement by the blocker pins.

While the above mentioned synchronizer assemblies have been widely used for many years, problems have been associated with the springs sandwiched between the members of the split pin assemblies. One configuration of the springs have been prone, during certain operating conditions, to partially escape from between the split pin members and thereby cause the synchronizer assembly to jam.

SUMMARY OF THE INVENTION

An object of this invention is to provide an improved synchronizer split pin spring assembly.

According to a feature of this invention, a double acting synchronizer clutch includes two axially movable friction rings rigidly connected together about a rotational axis in axially spaced relation on opposite sides of an axially movable, radially extending flange. A plurality of circumferentially spaced apart openings extend axially through the flange. A split pin assembly, including a pair of members and a spring assembly, extends axially through each opening and between the friction rings for effecting axial movement of the friction rings in response to initial axial movement of the flange from a neutral position. Each pair of members defines a generally cylindrical outer surface with a radially outwardly open annular detent groove for receiving a peripheral surface of one of the openings. The members of each pair of members each have first and second ends respectively disposed to abut one of the friction rings. Each spring assembly includes at least first and second opposed leaf springs each having a bowed length in the axial direction of the opening and a width corresponding to a transverse direction. The leaf springs are sandwiched between mutually facing surfaces of each pair of members. The leaf springs each have first and second end portions with the first and second end portions of the first and second leaf springs respectively in contact with each other and with the second and first end portions of the first and second leaf springs respectively in contact with each other.

The improvement is characterized by retainer means disposed at the leaf spring first and second end portions of each spring assembly for limiting movement of the leaf springs relative to each other in the transverse direction.

BRIEF DESCRIPTION OF THE DRAWINGS

The synchronizer assembly of the invention is shown in the accompanying drawings in which:

FIG. 4 is a sectional view of the split pin assembly looking along line 4—4 of FIG. 2;

FIG. 6 illustrates a position of the split pin assembly with the retainer of FIG. 5 installed and looking along line 6—6 of FIG. 2 while the clutch is in a neutral position with centrifugal forces acting on the split pin assembly;

FIG. 7 is the same as FIG. 6 but without the retainer and with the springs in one of several positions they may move to;

FIG. 8 is a perspective view of the split pin springs with forces acting thereon while the split pin assembly is in the position of FIGS. 6 and 7;

FIG. 9 is an alternative embodiment of the springs in FIGS. 2-4; and

FIG. 10 is a sectional view of the springs in FIG. 7 looking along line 10—10 of FIG. 9.

DETAILED DESCRIPTION OF THE DRAWINGS

Figure 1:
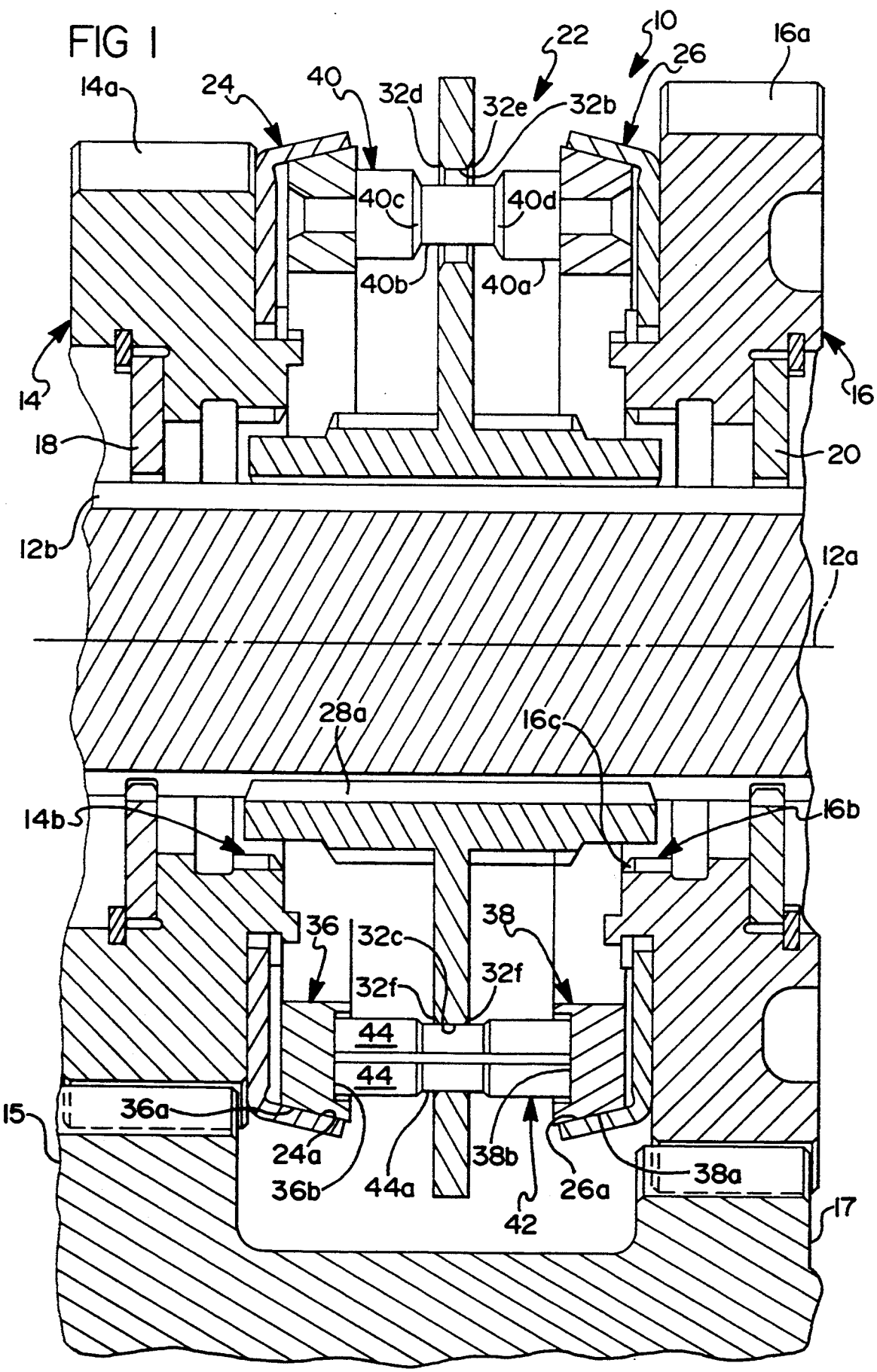
FIG. 1 is a vertically sectioned view of a double acting synchronizer clutch having a schematically illustrated split pin assembly therein shown ninety degrees out of its correct position.

Looking first mainly at FIG. 1, therein is a simplified illustration of a gear and synchronizer assembly 10 for an otherwise unshown transmission of the type intended for use in a land vehicle, particularly of the type used in medium and heavy duty trucks. However, assembly 10 may be used in other applications. The assembly includes a shaft 12 mounted for rotation about a central axis 12a in unshown manner, spaced apart ratio gears 14, 16 rotatably supported on the shaft and secured against axial movement relative to the shaft by annular thrust members 18,20 affixed to the shaft in known manner, and a double-acting pin-type synchronizer clutch mechanism 22. When assembly 10 is part of a twin countershaft transmission, such as disclosed in U.S. Pat. Nos. 3,648,546 and 4,788,889, which patents are incorporated herein by reference, teeth 14a,16a on the gears will be in constant mesh with engine driven gears 15,17 on countershafts, shaft 12 will be connected to or selectively connectable to a load, and shaft 12 will be free to move somewhat radially as is well known in the prior art. Herein gear 14 represents a lower speed ratio gear than does gear 16; both may be up and down shifted into.

The synchronizer mechanism 22 includes annular friction members or rings 24,26 and annular jaw clutch members 14b,16b affixed to gears 14,16, a jaw clutch or collar member 28 having internal spline teeth 28a slidably mating with external spline teeth 12b integrally formed with the shaft or otherwise affixed thereto, a radially extending shift flange 32, having a radially inner extent affixed to jaw clutch member 28, annular friction members or rings 36,38 rigidly secured together by three circumferentially spaced apart blocker pins 40 extending axially from each of the friction members and through openings 32b in the flange, and three circumferentially spaced apart pre-energizer or split pin assemblies 42 extending axially between the friction members and through openings 32c alternately spaced between openings 32b. Blocker pins 40 and split pin assemblies 42 may be more or less in number than disclosed herein.

As is readily seen, friction members 24,36 and 26,38 pair up to define friction clutches for synchronizing the gears to the shaft prior to engagement of the jaw clutches. Cone clutches are preferred; however, other types of friction clutches may be used. Friction members 24,26 may be affixed to the associated gears in any of several known ways, e.g., by welding, or as is known in the art, they may be formed integral with the gears. Friction members 24,26 have internal cone friction surfaces 24a,26a which respectively mate with external cone friction surfaces 36a,38a. Members 24,26 and 36,38 also are respectively referred to as synchronizer cups and rings. A wide range of cone angles may be used; herein, cone angles of between twelve degrees and seven and one-half degrees are contemplated. However, other angles may be used, even flat plates in some applications. The friction surfaces 36a,38a and/or 24a,26a may be defined by any of several known materials.

Each pin 40 includes major diameter portions 40a having diameters slightly less than the diameter of flange openings 32b, a reduced diameter or groove portion 40b spaced between friction rings 36,38 (herein midway), and conical blocker shoulders or surfaces 40c,40d extending radially outward from the pin axis and axially away from each other at angles relative to a line normal to the pin axis. The grooved portions, when disposed within their respective flange openings, allow limited rotation of the rigid friction rings and pin assemblies relative to the flange to effect engagement of the pin blocker shoulders with chamfered blocker shoulders 32d,32e defined about the flange openings. The shoulders, when engaged, provide blocking until synchronism is substantially reached.

Each split pin assembly 42, which is shown in the correct rotational positions in FIGS. 2, 3, 6 and 7, includes a pair of semi-cylindrical members 44 having a major diameter less than the diameter of openings 32c when squeezed together, semi-annular grooves 44a with chamfered ends 44b and a leaf spring assembly 46 sandwiched between mutually facing inner surfaces 45 of members 44 for biasing the annular grooves apart to engage groove chamfers 44b with flange chamfers 32f formed about opposite ends of openings 32c. Ends 44c,44d of the members 44 abut friction rings 36,38 and are disposed within elongated recesses 37,39 therein.

While flange 32 is in the neutral position, the friction surfaces of the cone clutches are spaced apart. When it is desired to couple either gear to the shaft, an appropriate and unshown shift mechanism connected to the outer periphery of flange 32 in known manner moves the flange axially along the axis of shaft 12 either left to couple gear 14 or right to couple gear 16. The shift mechanism may be manually moved by a vehicle operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever.

Initial axial rightward movement of flange 32 by the shift mechanism engages flange chamfers 32f with pre-energizer chamfers 44b to effect movement of friction ring surface 38a into engagement with friction surface 26a. The initial engagement force of friction surfaces 38a,26a is, of course, a function of the force of spring assemblies 46 and the angles of the chamfers. The initial frictional engagement, provided an asynchronous condition exists, produces an initial cone clutch engaging force and synchronizing torque which ensures limited relative rotation between flange 32 and the engaged friction ring, and hence, movement of the reduced diameter pin portions 40b to the appropriate sides of the flange openings 32b to provide engagement of pin blocker shoulders 40c with flange blocker shoulders 32d. When the blocker shoulders are engaged, full operator shift force on flange 32 is transmitted to friction ring 38 via the blocker shoulders, whereby the cone clutch is engaged by the full force of the operator shift force. Since the blocker shoulders are disposed at angles relative to the axial direction of operator shift force, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker shoulders move the pins into concentric relation with openings 32b to allow continued axial movement of the flange and engagement of the external jaw teeth 28b of jaw member 28 with internal jaw teeth of jaw member 16b. As is known in the prior art and as is specified by reference numbers only for jaw member 16b, the lead portions of the jaw teeth have rake leading edges 16c to reduce tooth damage during initial contact, and have chamfer or wedge faces 16d to clock the teeth into mating alignment. Jaw teeth with such lead portions are disclosed in greater detail in U.S. Pat. No. 4,246,993 which is incorporated herein by reference along with U.S. Pat. No. 3,265,173 which provides a teaching for the rake angles. The wedge faces, which may be asymmetric, prevent delay of shift completion due to abutting contact of the leading edges of the teeth. To facilitate smooth and relatively effortless completion of shifts, the jaw teeth are preferably as fine or small, as practicable, in the circumferential direction, thereby minimizing the number or rotational clocking degrees necessary to matingly align the jaw teeth.

Looking now at FIGS. 2–5, therein is a detailed illustration of split pin assembly 42 and in particular mutually facing surfaces 45 of the split pin members 44 and spring assembly 46. Split pin member surfaces 45 each include longitudinally extending side surfaces 45a,45b separated in a transverse direction by a longitudinally extending channel 45c, and flat recessed surfaces 45d,45e respectively between the ends of channel 45c and member ends 44c,44d.

Each spring assembly 46 includes at least two substantially identical leaf springs 48 which, when sandwiched between members 44, have their spring ends in contact and their centers bowed away from each other. Herein, each spring is a single leaf; however, each spring may be composed of multiple leafs. Each leaf includes a central portion 48a having a transverse width closely embraced by the sidewalls of channel 45c of one of the split pin members and end portions 48b,48c in contact with the ends of the other spring. Each leaf has a bowed axial length less than the distance between split pin member ends 44c,44d, thereby allowing the axial length of the leafs to increase when they are compressed and allowing the touching ends of the leafs to move axially relative to each other. Each leaf end portion is provided with an extended transverse width greater than the transverse width of the central portion but less than the minor diameter of the friction ring oblong recesses 37,39.

Split pin members 44 and spring leafs 48, as thus far described, are substantially as known in the prior art. The central portions 48a of the leafs provide the effective spring action and the transversely extended width of the leaf end portions are for maintaining the leafs in their proper position between the split pin members 44. However, during some modes of the transmission operation, the leafs have partially escaped their proper position between the split pin members, thereby causing the synchronizer to jam and become inoperative. One operational mode of the transmission believed to cause or allow partial escape of the springs occurs while the synchronizer assembly shift flange 32 is in neutral and centrifugal forces are acting on split pin members 44 as illustrated in FIGS. 6 and 7, thereby causing the inner surfaces of the split pin members to open in clamshell fashion. As may be seen in FIGS. 7 and 8, such clamshell fashion opening of members 44 applies forces F to leaf springs 48 which biases the springs in directions tending to roll the springs relative to each other in the direction of arrows E in FIG. 8 and to also move transverse or widthwise to each other. With reference to FIG. 7, such tendency of the springs to roll and move transverse relative to each other is believed to be the cause of the spring ends escaping from between members 44 and out of the associated friction ring recess. For example, while members 44 are open, as in FIG. 7, the leaf end portions axially spaced furthest from the respective ends of members 44, such as end portions 48b, have moved transverse relative to their opposed leaf spring, i.e., radially inward in FIG. 7, and out of the associated friction ring recess, thereby jamming the split pin members in their expanded position and preventing axial movement of shift flange 32 out of detent grooves 44a.

Figure 2:
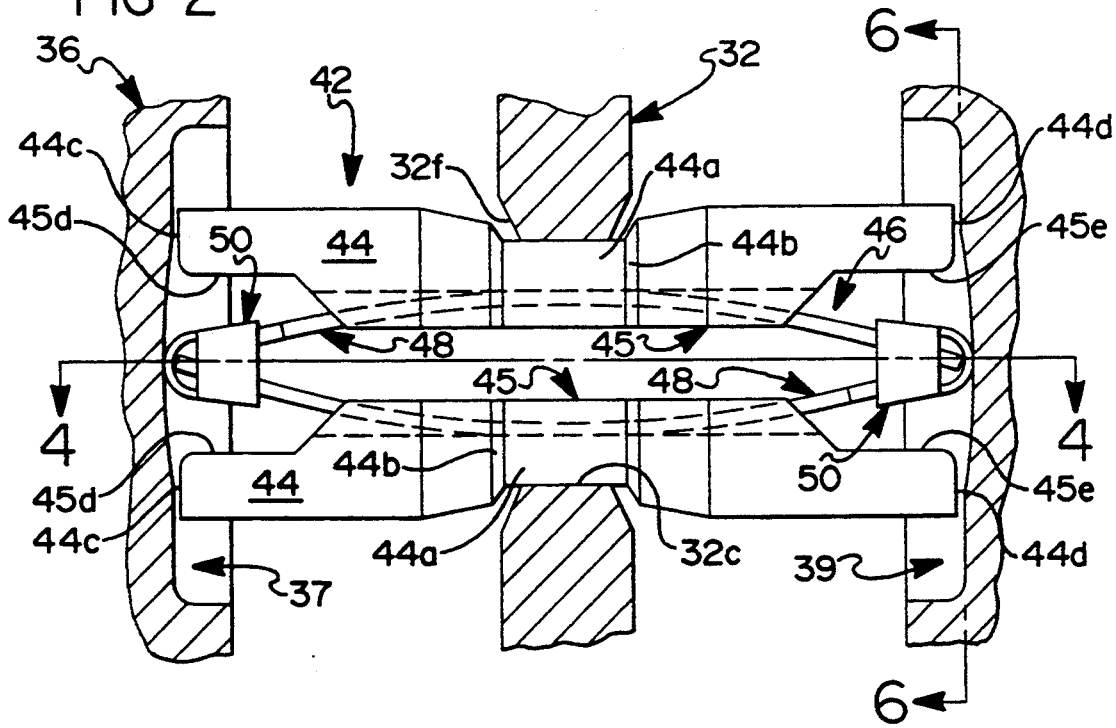
FIG. 2 is the split pin assembly of FIG. 1 shown in detail and rotated ninety degrees from the position shown in FIG. 1.
Figure 3:
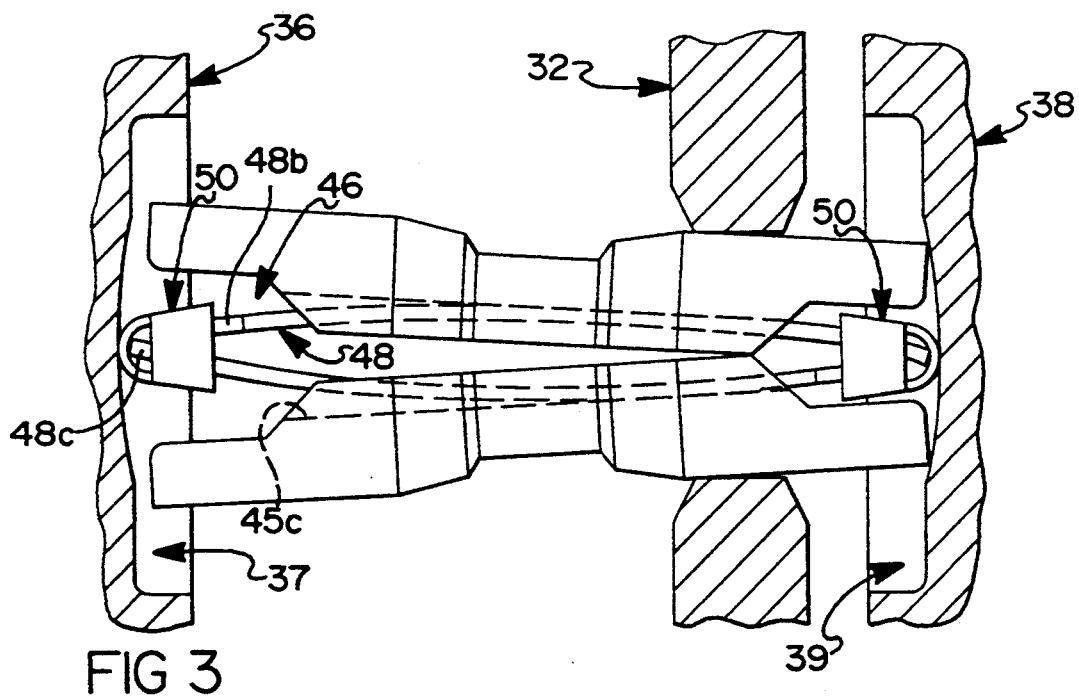
FIG. 3 illustrates the split pin assembly while the clutch is fully activated rightward from the neutral position of FIGS. 1 and 2.
Figure 5:
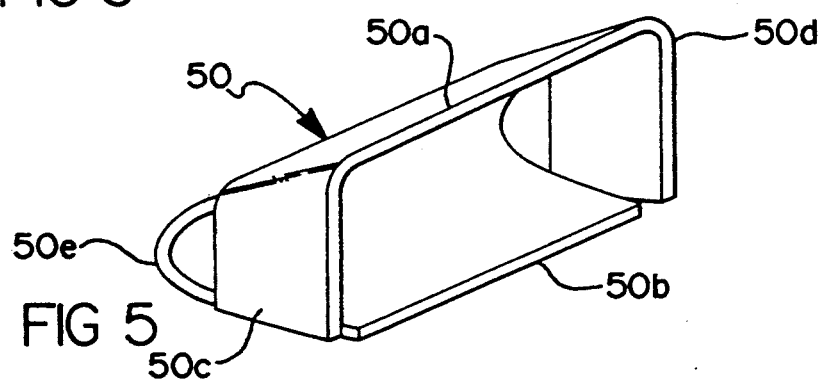
FIG. 5 is a spring end retainer for the springs in FIGS. 2 and 3.

Such relative movement of the leaf spring end portions in the spring assembly embodiment of FIGS. 2–4 is prevented by retainers 50, one of which is shown in the perspective view of FIG. 5. Each retainer 50 is a rigid bracket having spaced apart wall portions 50a,50b,50c,50d defining a rectangular opening receiving the leaf spring first and second end portions at both ends of each split pin assembly. Wall portions 50a,50b define a U-shaped cross-section with a closed end 50e thereof abutting the axially facing surfaces of oblong recesses 37,39. Wall portions 50a,50b are spaced apart enough to allow relative axial sliding movement of the leaf end portions therein during flexing of the leafs but sufficiently close together to react the roll tendency forces F. Wall portions 50a,50b are also sufficiently close together to not interfere with movement of flat recess surfaces 45d,45e of the split pin members. Wall portions 50c, 50d, which define rigidly secured together tabs, slidably embrace the transverse width of the leaf end portions on the interior surfaces thereof and are in turn slidably embraced on their outer surfaces by radially spaced apart wall surfaces 37a,37b and 39a,39b of oblong recess 37,39.

Looking now at FIGS. 9 and 10, therein an alternative spring assembly 52 also includes two leaf springs 54 and retainers 55. Retainers 55, though functionally equivalent to retainers 50, differ in that they are formed integrally by an extension of one end of each leaf spring. Each leaf includes a central portion 54a and first and second end portions 54b,54c with transverse widths greater than the width of the central portion. Each retainer 55 is defined by the first end portion 54b, an axial extension 54d thereof reverse bent to form walls with a U-shaped cross-section as with retainer 50 and transverse extensions 54e,54f of the axial extension or the first end portion are bent at right angles to form tabs equivalent to tabs 50c,50d or retainer 50.

Two embodiments of the invention have been disclosed for illustrative purposes. Many variations and modifications of the disclosed embodiments are believed to be within the spirit of the invention. The following claims are intended to cover the inventive portion of the disclosed embodiments and variations and modifications believed to be within the spirit of the invention.

What is claimed is:

1. A double acting synchronizer clutch assembly including two axially movable friction rings rigidly connected together about a rotational axis in axially spaced relation on opposite sides of an axially movable, radially extending flange; a plurality of circumferentially spaced apart openings extending axially through the flange; a split pin assembly including a pair of members and a spring assembly extending axially through each opening and between the friction rings for effecting axial movement of the friction rings in response to initial axial movement of the flange from a neutral position, each pair of members defining a generally cylindrical outer surface with a radially outwardly open annular detent groove for receiving a peripheral surface of one of the openings, the members of each pair of members each having first and second ends respectively disposed to abut one of the friction rings; each spring assembly including at least first and second opposed leaf springs each having a bowed length in the axial direction of the opening and a width corresponding to a transverse direction, the leaf springs sandwiched between mutually facing surfaces of each pair of members, the leaf springs each having first and second end portions with the first and second end portions of the first and second leaf springs respectively in contact with each other and with the second and first end portions of the first and second leaf springs respectively in contact with each other and with each first end portion axially overlapping the associated second end portion, characterized by:

retainer means disposed at the leaf spring first and second end portions of each spring assembly, each retainer means allowing the leaf spring ends in contact with each other to move axially relative to each other and for including means reacting roll forces tending to roll the springs relative to each other.

2. The clutch assembly of claim 1, wherein each retainer means further includes spaced apart tabs rigidly secured together and embracing the width of at least the second end portion for limiting widthwise movement of the leaf springs relative to each other in the transverse direction.

3. The clutch assembly of claim 2, wherein each retainer means includes a rigid bracket having four spaced apart side walls defining a rectangular opening receiving the first and second end portions with two of the spaced apart side walls in the transverse direction defining the tabs and two of the spaced apart side walls extending between the tabs reacting the roll forces.

4. The clutch assembly of claim 1, wherein each first end portion includes a U-shaped cross-section receiving the second end portion associated therewith, each U-shaped cross-section formed by reverse bending an axial extension of the first portion and thereby defining means reacting the roll forces tending to roll the springs relative to each other.

5. The clutch assembly of claim 4, wherein opposite edges defining the width of one of the end portions of each first and second end portions in contact with each other includes tabs extending therefrom at substantially right angles and embracing the width of the other end portion.

6. The clutch assembly of claim 1, wherein mutually, axially facing surfaces of the friction rings each include a plurality of blind, oblong recesses equal in number and circumferential spacing to the circumferentially spaced apart openings in the flange and circumferentially positioned to receive the ends of the members of the split pin assemblies, each oblong recess being elongated in the circumferential direction and of sufficient diameter in a radial direction relative to the rotational axis to allow sliding movement of the ends of the members in the circumferential direction.

7. The clutch assembly of claim 6, wherein each retainer means further includes spaced apart tabs rigidly secured together and embracing the width of at least the second end portion for limiting movement of the leaf springs relative to each other in the transverse direction and the recesses are of sufficient depth to slidably support the spaced about tabs of the retainer means.

8. The clutch assembly of claim 7, wherein each retainer means includes a rigid bracket having four spaced apart side walls defining a rectangular opening receiving the first and second end portions with two of the spaced apart side walls in the transverse direction defining the tabs and two of the spaced apart side walls extending between the tabs reacting the roll forces.

9. The clutch assembly of claim 6, wherein each first end portion including a U-shaped cross-section receiving the second end portion associated therewith, each U-shaped cross-section formed by reverse bending an axial extension of the first end portion and thereby defining means reacting the roll forces tending to roll the springs relative to each other.

10. The clutch assembly of claim 9, wherein opposite edges defining the width of one of the end portions of each first and second end portions in contact with each other includes tabs extending therefrom at substantially right angles and embracing the width of the other end portion.

11. A double acting synchronizer clutch assembly including two axially movable friction rings rigidly connected together about a rotational axis in axially spaced relation on opposite sides of an axially movable, radially extending flange; a plurality of circumferentially spaced apart openings extending axially through the flange; a split pin assembly including a pair of members and a spring assembly extending axially through each opening and between the friction rings for effecting axial movement of the friction rings in response to initial axial movement of the flange from a neutral position, each pair of members defining a generally cylindrical outer surface with a radially outwardly open annular detent groove for receiving a peripheral surface of one of the openings, the members of each pair of members each having first and second ends respectively disposed to abut one of the friction rings; each spring assembly including at least first and second opposed leaf springs each having a bowed length in the axial direction of the opening and a width corresponding to a transverse direction, the leaf springs sandwiched between mutually facing surfaces of each pair of members, the leaf springs each having first and second end portions with the first and second end portions of the first and second leaf springs respectively in contact with each other and with the second and first end portions of the first and second leaf springs respectively in contact with each other and with each first end portion axially overlapping the associated second end portion, characterized by:

retainer means disposed at the leaf spring first and second end portions of each spring assembly for limiting movement of the leaf springs relative to each other in the transverse direction.

12. The clutch assembly of claim 11, wherein the retainer means each includes spaced apart tabs rigidly secured together and embracing the width of at least the second end portion.

13. The clutch assembly of claim 12, wherein each retainer means includes a rigid bracket having four spaced apart side walls defining a rectangular opening receiving the first and second end portions with two of the spaced apart side walls in the transverse direction defining the tabs and two of the spaced apart side walls extending between the tabs reacting roll forces tending to roll the springs relative to each other.

14. The clutch assembly of claim 12, wherein opposite edges defining the width of one of the end portions of each first and second end portions in contact with each other includes the tabs extending therefrom at substantially right angles and embracing the width of the other end portion.

15. The clutch assembly of claim 14, wherein each first end portion of each first and second end portions in contact with each other having a U-shaped cross-section receiving the second end portion associated therewith, each U-shaped cross-section formed by reverse bending an axial extension of the first portion and thereby defining means reacting roll forces tending to roll the springs relative to each other.

16. The clutch assembly of claim 11, wherein mutually, axially facing surfaces of the friction rings each include a plurality of blind, oblong recesses equal in number and circumferential spacing to the circumferentially spaced apart openings in the flange and circumferentially positioned to receive the ends of the members of the split pin assemblies, each oblong recess being elongated in the circumferential direction and of sufficient diameter in a radial direction relative to the rotational axis to allow sliding movement of the ends of the members in the circumferential direction.

17. The clutch assembly of claim 16, wherein the retainer means each include spaced apart tabs rigidly secured together and embracing the width of at least the second end portion and the recesses are of sufficient depth to slidably support the spaced about tabs of the retainer means.

18. The clutch assembly of claim 17, wherein each retainer means includes a rigid bracket having four spaced apart side walls defining a rectangular opening receiving the first and second end portions with two of the spaced apart side walls in the transverse direction defining the tabs and two of the spaced apart side walls extending between the tabs reacting roll forces tending to roll the springs relative to each other.

19. The clutch assembly of claim 18, wherein opposite edges defining the width of one of the end portions of each first and second end portions in contact with each other includes the tabs extending therefrom at substantially right angles and embracing the width of the other end portion.

20. The clutch assembly of claim 17, wherein each first end portion includes a U-shaped cross-section receiving the second end portion associated therewith, each U-shaped cross-section formed by reverse bending an axial extension of the first end portion and thereby defining means reacting roll forces tending to roll the springs relative to each other.

* * * * *